US009172816B2

(12) United States Patent
Ahgren

(10) Patent No.: US 9,172,816 B2
(45) Date of Patent: Oct. 27, 2015

(54) ECHO SUPPRESSION

(71) Applicant: Microsoft corporation, Redmond, WA (US)

(72) Inventor: Per Ahgren, Knivsta (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 14/015,998

(22) Filed: Aug. 30, 2013

(65) Prior Publication Data
US 2014/0357326 A1 Dec. 4, 2014

(51) Int. Cl.
*H04M 1/00* (2006.01)
*H04M 9/08* (2006.01)

(52) U.S. Cl.
CPC ...................... *H04M 9/082* (2013.01)

(58) Field of Classification Search
CPC ......... H04M 9/082; H04M 1/00; H04M 9/08; H04M 9/00; H04B 1/38; H04B 3/23
USPC .................. 455/570, 10, 501, 504, 506, 63.1, 455/67.13; 379/406.08, 406.01; 381/66
See application file for complete search history.

(56) References Cited

U.S. PATENT DOCUMENTS

| | | | |
|---|---|---|---|
| 3,787,645 A | 1/1974 | Ochiai et al. | |
| 4,977,591 A | 12/1990 | Chen et al. | |
| 5,157,653 A | 10/1992 | Genter | |
| 5,187,692 A | 2/1993 | Haneda et al. | |
| 5,305,307 A | 4/1994 | Chu | |
| 5,559,881 A * | 9/1996 | Sih | 379/406.08 |
| 5,796,819 A | 8/1998 | Romesburg | |
| 5,822,275 A * | 10/1998 | Michalski | 367/99 |
| 5,852,661 A * | 12/1998 | Chen | 379/406.07 |
| 5,995,620 A * | 11/1999 | Wigren | 379/406.09 |
| 6,415,029 B1 | 7/2002 | Piket et al. | |

(Continued)

FOREIGN PATENT DOCUMENTS

| EP | 1978649 | 10/2008 |
|---|---|---|
| WO | WO-2011133075 | 10/2011 |

(Continued)

OTHER PUBLICATIONS

"International Search Report and Written Opinion", Application No. PCT/US2014/039871, Aug. 29, 2014, 10 pages.

(Continued)

*Primary Examiner* — Pablo Tran
(74) *Attorney, Agent, or Firm* — Danielle Johnston-Holmes; Micky Minhas

(57) ABSTRACT

An echo path of the echo in a received audio signal is modelled using an adaptive model to determine an adaptive model estimate of the echo. The adaptive model estimate is used to determine an estimate of the echo power of the echo in the received audio signal. The power of the received audio signal is determined. The estimate of the echo power and the determined power of the received audio signal are used to determine echo suppression gains. Temporal smoothing is applied to one or more of the echo suppression gains and the one or more smoothed echo suppression gains are used to apply echo suppression to the received audio signal, thereby suppressing the echo in the received audio signal, wherein the amount of smoothing applied to the echo suppression gains is varied according to a non-decreasing function of the frequency of the received audio signal.

20 Claims, 4 Drawing Sheets

(56) References Cited

U.S. PATENT DOCUMENTS

| | | | |
|---|---|---|---|
| 6,507,652 | B1 | 1/2003 | Laberteaux |
| 6,606,382 | B2* | 8/2003 | Gupta ............... 379/406.05 |
| 6,836,547 | B2 | 12/2004 | Tahernezhaadi |
| 6,944,289 | B2* | 9/2005 | Tahernezhaadi et al. ............... 379/406.01 |
| 6,990,195 | B1 | 1/2006 | Leblanc et al. |
| 7,003,099 | B1 | 2/2006 | Zhang et al. |
| 7,054,437 | B2* | 5/2006 | Enzner ............... 379/406.08 |
| 7,054,451 | B2 | 5/2006 | Janse et al. |
| 7,388,954 | B2 | 6/2008 | Pessoa et al. |
| 7,433,463 | B2 | 10/2008 | Alves et al. |
| 7,684,559 | B2 | 3/2010 | Hoshuyama |
| 7,773,743 | B2 | 8/2010 | Stokes et al. |
| 7,860,235 | B2 | 12/2010 | Sudo et al. |
| 2002/0054685 | A1* | 5/2002 | Avendano et al. ............ 381/66 |
| 2003/0123674 | A1 | 7/2003 | Boland |
| 2003/0185402 | A1 | 10/2003 | Benesty et al. |
| 2004/0071207 | A1 | 4/2004 | Skidmore et al. |
| 2004/0161101 | A1 | 8/2004 | Yiu et al. |
| 2006/0018460 | A1* | 1/2006 | McCree ............... 379/406.08 |
| 2006/0147032 | A1 | 7/2006 | McCree et al. |
| 2010/0208908 | A1* | 8/2010 | Hoshuyama ............ 381/66 |
| 2010/0215185 | A1 | 8/2010 | Christoph |
| 2010/0246804 | A1 | 9/2010 | Prakash et al. |
| 2010/0303228 | A1 | 12/2010 | Zeng et al. |
| 2011/0081026 | A1 | 4/2011 | Ramakrishnan et al. |
| 2011/0158363 | A1 | 6/2011 | Andersen et al. |
| 2011/0261949 | A1 | 10/2011 | Dyba et al. |
| 2012/0250872 | A1 | 10/2012 | Leblanc et al. |
| 2012/0290525 | A1 | 11/2012 | Malik et al. |
| 2014/0357323 | A1 | 12/2014 | Ahgren |
| 2014/0357324 | A1 | 12/2014 | Ahgren |
| 2014/0357325 | A1 | 12/2014 | Ahgren |

FOREIGN PATENT DOCUMENTS

| | | |
|---|---|---|
| WO | WO-2012109385 | 8/2012 |
| WO | WO-2012166092 | 12/2012 |

OTHER PUBLICATIONS

"International Search Report and Written Opinion", Application No. PCT/US2014/039873, Sep. 1, 2014, 10 pages.

"International Search Report and Written Opinion", Application No. PCT/US2014/039869, Aug. 26, 2014, 9 pages.

"International Search Report and Written Opinion", Application No, PCT/US2014/039872, Sep. 8, 2014, 9 pages.

Azpicueta-Ruiz, et al., "Novel Schemes for Nonlinear Acoustic Echo Cancellation Based on Filter Combinations", 2009 IEEE, Apr. 19, 2009, pp. 193-196.

Hoshuyama, et al., "An Acoustic Echo Suppressor Based on a Frequency-Domain Model of Highly Nonlinear Residual Echo", In IEEE International Conference on Acoustics, Speech and Signal Processing, May 14, 2006, pp. 4.

"SEA2M™ Speech Enhancement Algorithms for Array of Microphones", In White Paper of NIIT MICRONAS, Retrieved from <http://www.rt-rk.com/white_papers/rt-rk_wp_sea2m.pdf>,(Nov. 2006), 33 pages.

Bendersky, et al., "Nonlinear Residual Acoustic Echo Suppression for High Levels of Harmonic Distortion", In International Conference on Acoustics, Speech and Signal Processing, Retrieved from <tp://research.microsoft.com/pubs/69504/diegobenderskyhdres.pdf>,(Apr. 2008), 4 pages.

Breining, et al., "Acoustic Echo Control—An Application of Very-High-Order Adaptive Filters", In IEEE Signal Processing Magazine, Retrieved from <http://ieeexplore.ieee.org/stamp/stamp.jsp?tp=&arnumber=774933>,(Jul. 1999), 28 pages.

Dyba, et al., "Network Echo Cancellers and Freescale Solutions Using the StarCore™ SC140 Core", Retrieved from <http://cache.freescale.com/files/dsp/doc/app_note/AN2598.pdf>, (Nov. 2004), 48 pages.

Gansler, et al., "Double-Talk Robust Fast Converging Algorithms for Network Echo Cancellation", In IEEE Transactions on Speech and Audio Processing, vol. 8, Issue 6, Retrieved from <http://externe.emt.inrs.ca/users/benesty/papers/sap_nov2000.pdf>, (Nov. 2000), 8 pages.

Ghose, et al., "A Double-talk Detector for Acoustic Echo Cancellation Applications", In Journal of Signal Processing, vol. 80, Issue 8, Retrieved from http://citeseerx.ist.psu.edu/viewdoc/download-?doi=10.1.1.59.800&rep=rep1&type=pdf>,(Aug. 2000), 9 pages.

Gupta, et al., "Nonlinear Acoustic Echo Control Using an Accelerometer", In Proceedings of the IEEE International Conference on Acoustics, Speech and Signal Processing, Retrieved from <http://enpub.fulton.asu.edu/sensip/SenSIP_Papers/Non_linear_echo_cancellation.pdf>,(Apr. 19, 2009), 4 pages.

Kaup, et al., "Nonlinear Acoustic Echo Cancellation", Retrieved from <http://lms.lnt.de/research/activity/audio/sign/nlaec/> on Jan. 22, 2013, 3 pages.

Stenger, et al., "Nonlinear Acoustic Echo Cancellation with 2nd Order Adaptive Volterra Filters", In Proceedings of IEEE International Conference on Acoustics, Speech and Signal Processing, Retrieved from <http://ieeexplore.ieee.org/xpls/abs_all.jsp?arnumber=759811>, (Mar. 15, 1999), 4 pages.

"Second Written Opinion", Application No. PCT/US2014/039869, May 6, 2015, 4 pages.

"Second Written Opinion", Application No. PCT/US2014/039871, May 7, 2015, 4 pages.

"Non-Final Office Action", Application No. 14/012,867, Jun. 3, 2015, 9 pages.

"International Preliminary Report on Patentability", Application No. PCT/US2014/039871, Jul. 20, 2015, 6 pages.

\* cited by examiner

ECHO SUPPRESSION

RELATED APPLICATION

This application claims priority under 35 USC 119 or 365 to Great Britain Application No. 1309777.9 filed May 31, 2013, the disclosure of which is incorporate in its entirety.

BACKGROUND

A device may have audio input apparatus that can be used to receive audio signals from the surrounding environment. The device may also have audio output apparatus that can be used to output audio signals to the surrounding environment. For example, a device may have one or more speakers for outputting audio signals and one or more microphones for receiving audio signals. Audio signals which are output from the speaker(s) of the device may be received as "echo" in the audio signal received by the microphone(s). It may be the case that this echo is not desired in the received audio signal. For example, the device may be a user device (such as a mobile phone, tablet, laptop, PC, etc) which is used in a communication event, such as an audio or video call, with another user device over a network. Far-end signals of the call may be output from the speaker at the user device and may be received as echo in the audio signals received by the microphone at the device. Such echo can be disturbing to users of the call, and the perceived quality of the call may be reduced due to the echo. In particular, the echo may cause interference for near-end audio signals which are intended to be received by the microphone and transmitted to the far-end in the call. Therefore echo cancellation and/or echo suppression may be applied to the received audio signals to thereby suppress the echo in the received audio signal. The power of the echo in the received audio signal may vary depending upon the arrangement of the user device. For example, the user device may be a mobile phone and in that case, the power of the echo in the received audio signal would normally be higher when the mobile phone is operating in a "hands-free" mode compared to when the mobile phone is not operating in a "hands-free" mode.

Echo cancellation (or "echo subtraction") techniques aim to estimate an echo signal included in the audio signal received at the microphone, based on knowledge of the audio signal which is output from the speaker. The estimate of the echo signal can then be subtracted from the received audio signal thereby removing at least some of the echo from the received audio signal. Echo suppression is used to apply frequency-dependent suppression to the received audio signal to thereby suppress the echo in the received audio signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of suppressing echo in a received audio signal. As part of the echo suppression, an echo path of the echo in the received audio signal is modelled using an adaptive model based on an outputted audio signal and the received audio signal to determine an adaptive model estimate of the echo in the received audio signal. The adaptive model estimate is used to determine an estimate of the echo power of the echo in the received audio signal. The power of the received audio signal is determined. The estimate of the echo power and the determined power of the received audio signal are used to determine echo suppression gains. Temporal smoothing is applied to one or more of the echo suppression gains and the one or more smoothed echo suppression gains are used to apply echo suppression to the received audio signal, thereby suppressing the echo in the received audio signal, wherein the amount of smoothing applied to the one or more echo suppression gains is varied according to a non-decreasing function of the frequency of the received audio signal.

The method may be used in a call (e.g. a call implementing voice over internet protocol (VoIP) to transmit audio data between user devices) in which case the outputted audio signal may be a far-end signal received from the far-end of the call, and the received signal includes the resulting echo and a near-end signal for transmission to the far-end of the call.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Figure 1:
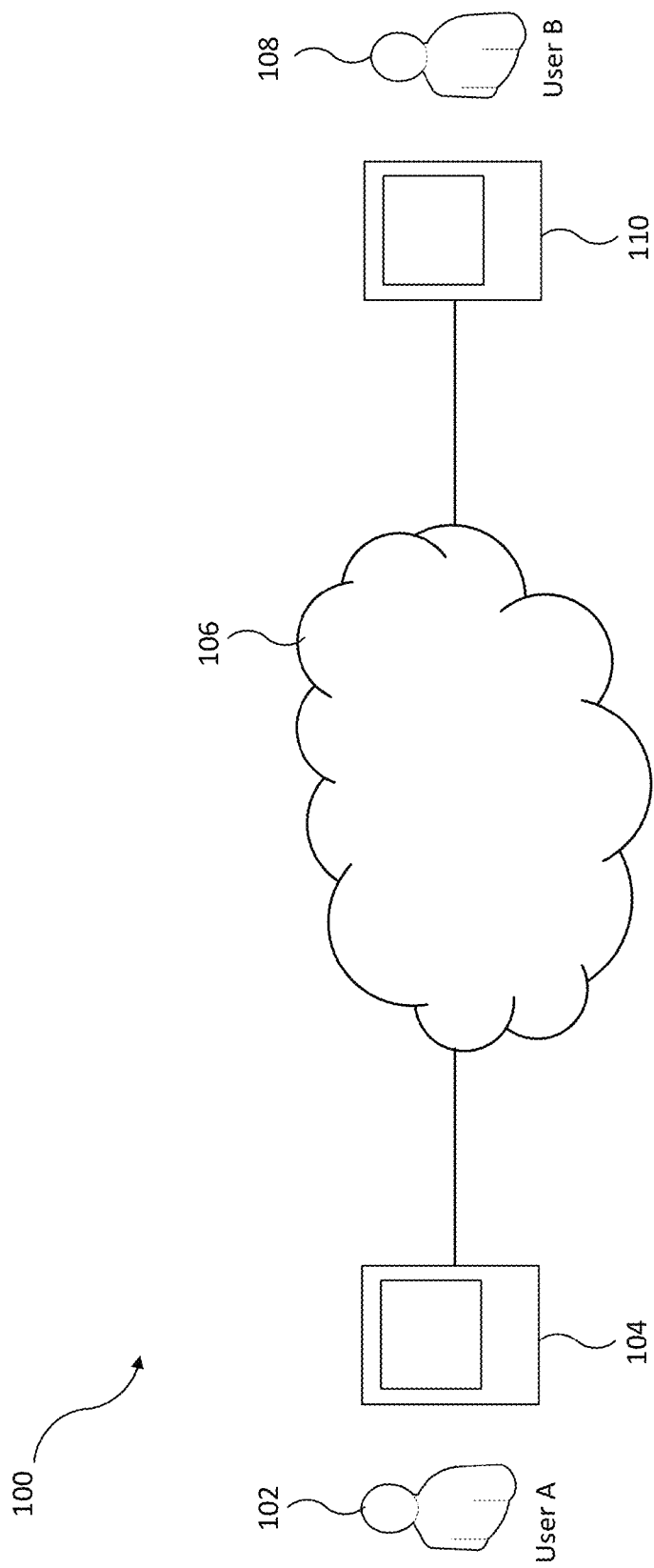
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 102 of the user device 104. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Figure 2:
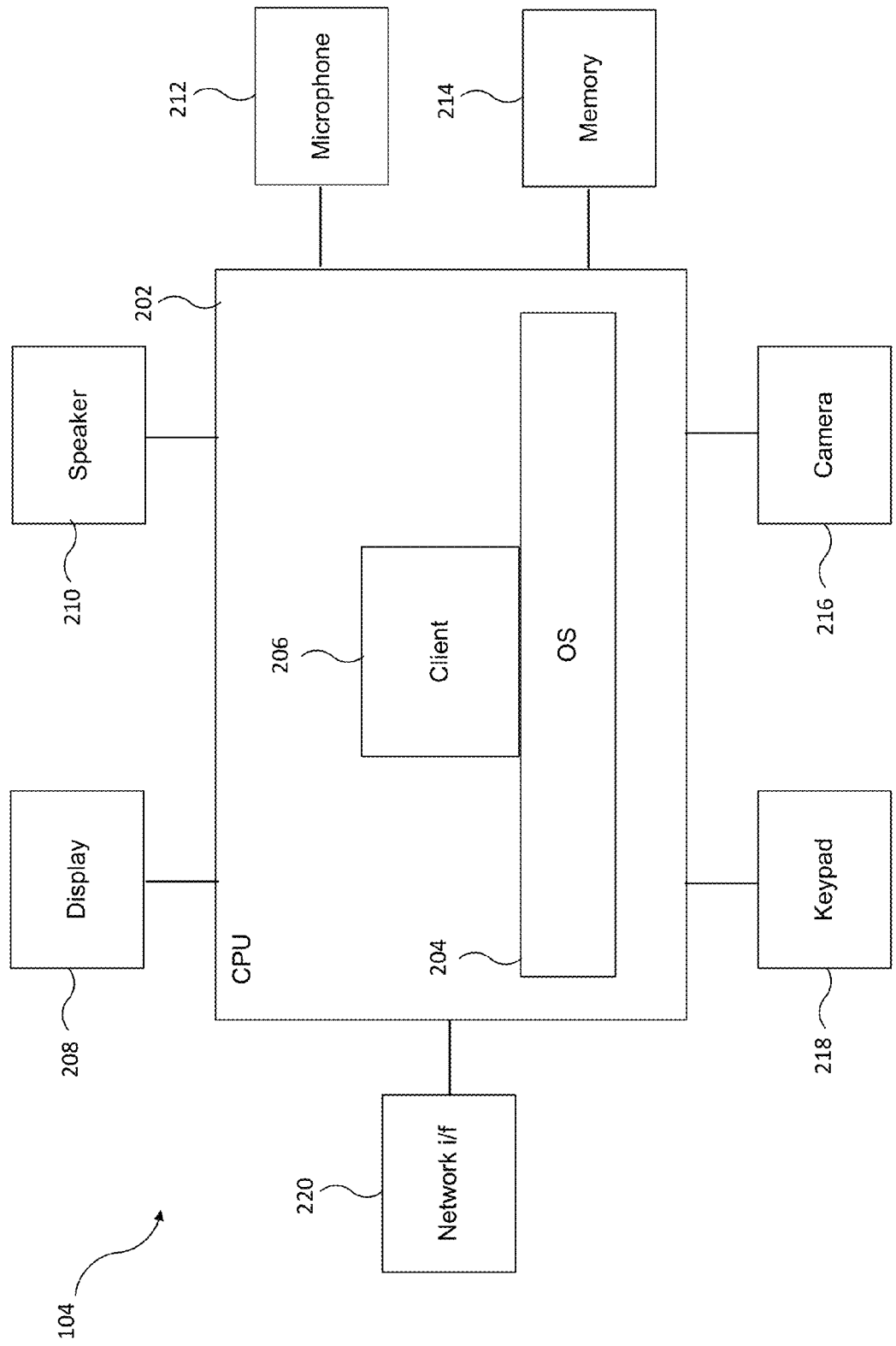
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

In acoustic echo cancellation the aim is to remove the echo signal s(t) in the microphone signal y(t) originating from the loudspeaker signal x(t). This should be done as exactly as possible and as non-obtrusively as possible in order to have as little impact on the perception of any near-end signal v(t). The microphone signal can be written as y(t)=s(t)+v(t). The echo signal is a function of the loudspeaker signal as s(t)=F(x(t)).

There are two main ways to achieve the above, one being echo subtraction and the other being echo suppression. Often these two approaches are combined.

Figure 3:
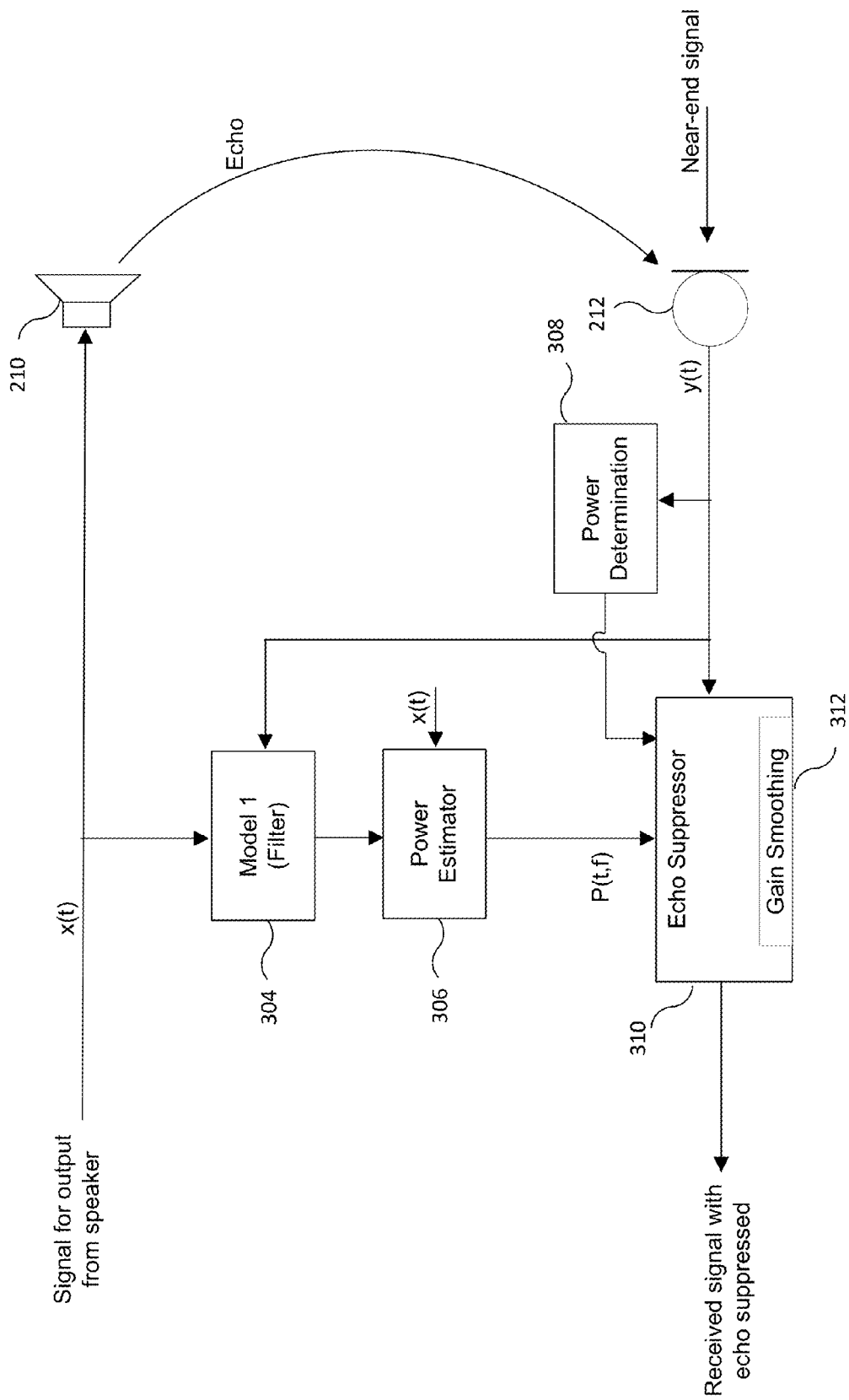
FIG. 3 is a functional diagram showing modules of a user device for use in echo suppression.
Figure 4:
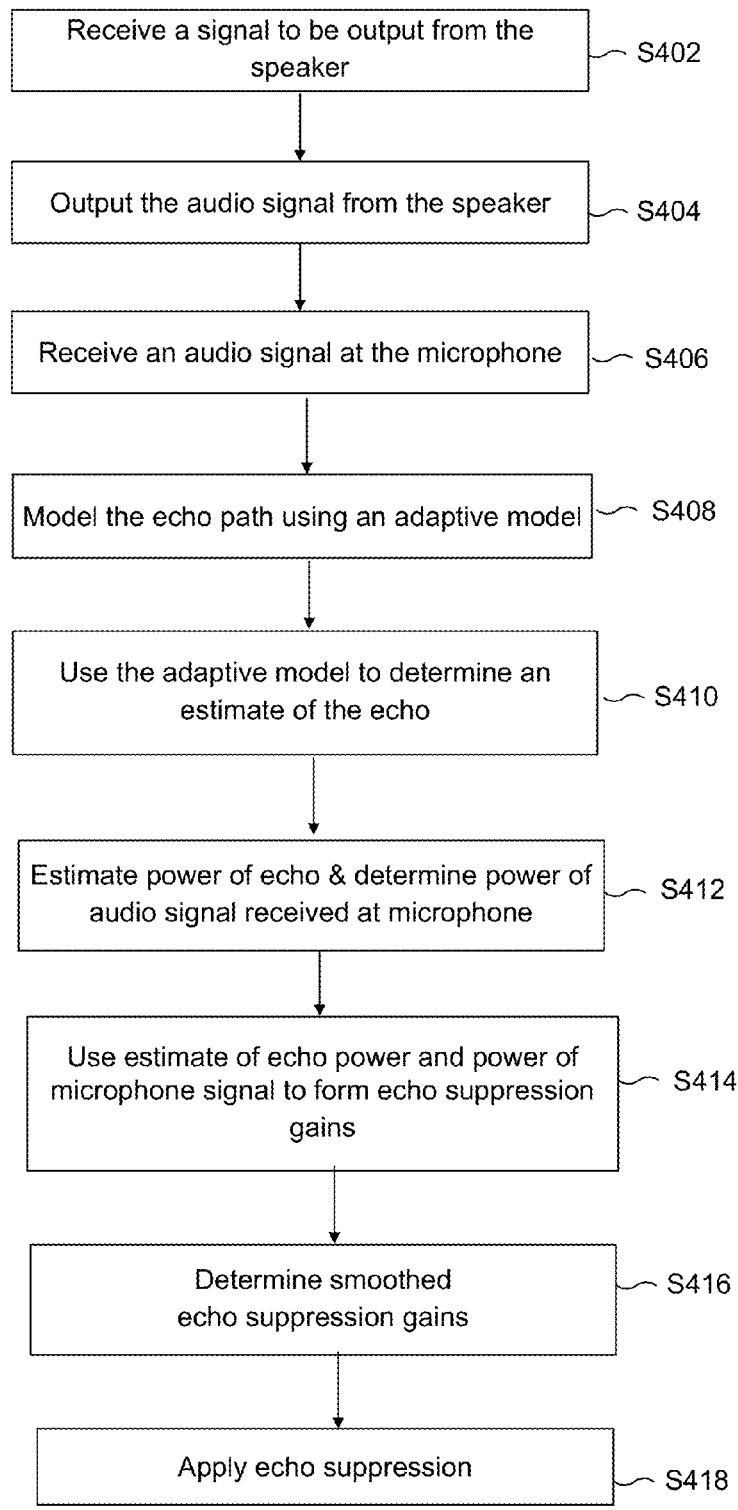
FIG. 4 is a flow chart for a process of suppressing echo.

With reference to FIGS. 3 and 4 there is now described a method of suppressing echo. FIG. 3 is a functional diagram of a part of the user device 104 showing how an echo suppression process is implemented, and FIG. 4 is a flow chart for the process of suppressing echo.

As shown in FIG. 3, the user device 104 comprises the speaker 210, the microphone 212, a modelling module 304, a power estimating module 306, a power determination module 308 and an echo suppression module 310.

A signal x(t) to be output from the speaker 210 is coupled to an input of the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receive audio signals from the surrounding environment. The signal to be output from the speaker 210 is coupled to a first input of the filter module 304. The output of the microphone 212 is coupled to a second input of the filter module 304. An output of the filter module 304 is coupled to a first input of a power estimating module 306. The signal to be output from the speaker 210 is coupled to a second input of the power estimating module 306. An output of the power estimating module 306 is coupled to a first input of the echo suppression module 310. The output of the microphone 212 is coupled to an input of the power determination module 308. An output of the power determination module 308 is coupled to a second input of the echo suppression module 310. The output of the microphone 212 is coupled to a third input of the echo suppression module 310. An output of the echo suppression module 310 is used to provide the received signal (with echo suppression having been applied) for further processing in the user device 104.

In step S402 a signal is received which is to be outputted from the speaker 210. For example, the signal to be outputted may be a far-end signal that has been received at the user device 104 from the user device 110 during a call between the users 102 and 108 over the communication system 100. Any processing that is required to be performed on the received signal (e.g. decoding using a speech codec, depacketizing, etc) is performed as is known in the art (e.g. by the client 206) to arrive at the signal x(t) which is suitable to be outputted from the speaker 210. The signal x(t) is a digital signal. At least some of the processing of the signal in the user device 104 prior to outputting the signal from the speaker 210 is performed in the digital domain. As is known in the art, a digital to analogue converter (DAC) is applied to the digital signal x(t) before playout from the loudspeaker 210. Similarly, an analogue to digital converter (ADC) is applied to the signal captured by the microphone 212 to arrive at the digital signal y(t).

In other embodiments, the signal to be outputted may be received from somewhere other than over the communication system 100 in a call. For example, the signal to be outputted may have been stored in the memory 214 and step S402 may comprise retrieving the signal from the memory 214.

In step S404 the audio signal x(t) is outputted from the speaker 210. In this way the audio signal x(t) is outputted to the user 102.

In step S406 the microphone 212 receives an audio signal. As shown in FIG. 3 the received audio signal may include a near-end signal which is a desired signal or "primary signal". The near-end signal is the signal that the user 102 intends the microphone 212 to receive. However, the received audio signal also includes an echo signal resulting from the audio signals outputted from the speaker 210 in step S404. The received audio signal may also include noise, such as background noise. Therefore, the total received audio signal y(t) can be given by the sum of the near-end signal, the echo and the noise. The echo and the noise act as interference for the near-end signal.

The filter module 304 takes as inputs the outputted audio signal x(t) and the received audio signal y(t). The filter module 304 is used to model the echo in the received audio signal y(t). In particular, the filter module 304 is operable to model the echo path of the echo in the received audio signal y(t) using the outputted audio signal x(t) and the received audio signal y(t) at step S408 to determine an estimate of the echo component in the near end signal y(t) at step S410.

The echo path describes the effects of the acoustic paths travelled by the far end signal from the speaker 210 to the microphone 212. The far end signal may travel directly from the speaker 210 to the microphone 212, or it may be reflected from various surfaces in the environment of the near end terminal. The echo path traversed by the far end signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal x(t) to an undesired echo component in the input signal. For an approximately linear echo path, the echo path h(t) describes how the echo in the received audio signal y(t) relates to the audio signal x(t) output from the speaker 210, e.g. according to the equation: $s(t)=\sum_{n=0}^{N_{true}} h_n(t)x(t-n)$, where s(t) is the echo in the received audio signal y(t), $N_{true}$ is a sufficiently large number to cover the non-negligible parts of the impulse response (theoretically $N_{true}$ is infinite), and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc), and (ii) characteristics of the speaker 210 and/or the microphone 212 which may alter the signal as it is outputted and/or received.

The filter module 304 models the echo path h(t) of the echo in the received audio signal y(t) by determining a weighted sum of the current and a finite number (N) of previous values of the outputted audio signal x(t). The filter module 304 therefore implements an Nth order filter which has a finite length (in time) over which it considers the values of the outputted audio signal x(t) in determining the estimate of the echo path $\hat{h}(t)$. In this way, the filter module 304 dynamically adapts the filter estimate of the echo path $\hat{h}(t)$. The operation is described by the following equation, which defines the echo in the received audio signal y(t) in terms of the outputted audio signal x(t): $\hat{s}_1(t)=\sum_{n=0}^{N} \hat{h}_n(t)x(t-n)$. Therefore N+1 samples of the outputted audio signal x(t) are used, with a respective N+1 weights $\hat{h}_n(t)$. The set of N+1 weights $\hat{h}_n(t)$ is referred to herein simply as the estimate of the echo path $\hat{h}(t)$. In other words the estimate of the echo path $\hat{h}(t)$ is a vector having N+1 values where the filter module 304 implements an Nth order filter, taking N+1 values (e.g. N+1 frames) of the signal x(t) into account.

It can be appreciated that it is easier to adapt the filter estimate of the echo path $\hat{h}(t)$ when the echo is a dominant part of the received audio signal, that is when y(t)≅s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the far end signal x(t) to generate an estimate of the echo component in the near end signal y(t) (at step S410) in accordance with the estimate of the echo path $\hat{h}(t)$. Regardless of the particular algorithm used, the filter coefficients of the filter module 304 are updated with each iteration of the algorithm, thus the coefficients of the filter module 304 are continually updated regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the first filter module 304 may operate to determine an estimate of the echo path $\hat{h}(t)$ and thus an estimate $\hat{s}_1(t)$ of the echo component in the near end signal y(t) in the time domain or in the frequency domain.

In step S412, the power estimating module 306 estimates the echo power in the received audio signal based on the filter estimate determined in step S410 and based on the far end signal x(t). There are many ways to do this that are known to persons skilled in the art and the scope of this disclosure is not limited to any particular method of determining an echo power estimate. The power estimating module 306 is arranged to output its corresponding echo power estimate to the echo suppression module 310.

Also in step S412, the power determination module 308 determines the power of the received audio signal y(t). Again, there are many ways to do this that are known to persons skilled in the art and the scope of this disclosure is not limited to any particular method. The power determination module 308 is arranged to supply an indication of determined power of the received audio signal y(t) to the echo suppression module 310.

The echo suppression module 310 receives as inputs the estimate of the echo power of the echo in the received audio signal from the filter module 304, an indication of determined power of the received audio signal y(t) from the power determination module 308, and the received audio signal y(t).

In step S414, in the echo suppression module 310, the estimated echo power is used together with the determined power of the microphone signal y(t), and possible other measures, to form echo suppression gains G(t,f) for time t and frequency f. The possible other measures may include but are not limited to information about the accuracy of the filter, and information about nonlinearities. These echo suppression gains have the purpose of suppressing any echo s(t) in the microphone signal y(t) to such a level that they are not noticeable in the presence of the near-end signal in the microphone input.

The magnitude of the echo suppression gains will necessarily be equal to or greater than zero, and less than or equal to one. That is, the magnitude of the echo suppression gains is indicative of the amount of noise suppression applied to the microphone signal y(t) for the respective time and frequency. The echo suppression gains are selected to be close to zero in circumstances where strong echo components need to be removed from the microphone signal y(t) (an echo suppression gain of zero indicates complete suppression). In the event of near-end speech only, the echo suppression gains are selected to be set to one in order to leave the desired speech signal unchanged (an echo suppression gain of one indicates no suppression). An echo suppression gain G(t,f) for time t and frequency f is the ratio of the power of the output signal to the power of the input signal of the echo suppression module 310, which may be expressed, for example, in decibels ("dB"). Decibels are based on a logarithmic scale, thus for example, a gain of one is equivalent to 0 dB which represents unity (no suppression) and a negative dB gain represents an output signal which is weaker than the input signal (suppression applied).

The echo suppression module 310 is designed to apply signal dependent suppression that varies both over time and frequency to the received audio signal y(t).

In order for the application of the gains to yield a pleasantly sounding output signal, the echo suppression gains typically have to be smoothed over time since otherwise rapidly variations in the echo suppression gains would sound bad. It is of interest to keep the amount of smoothing to a minimum since the smoothing causes more echo suppressing to be applied than the echo signal at hand may require. The type of smoothing applied in embodiments of this disclosure is "temporal" smoothing i.e. embodiments relate to how the gains for separate frequency bands are smoothed over time.

In step S416, the gain smoothing module 312 determines smoothed echo suppression gains G(t,f) in certain conditions.

In embodiments, when smoothing of the echo suppression gains is required the amount of the temporal smoothing of the gains in the echo suppression module is adjusted in such a way that the amount of smoothing is varied according to a non-decreasing function of the frequency of the received audio signal y(t), in the sense that the amount of smoothing does not decrease when the frequency of the received audio signal y(t) increases. That is, more smoothing is performed for higher frequency gains than for lower frequency gains. The amount of the temporal smoothing of the gains in the echo suppression module may be adjusted such that the amount of smoothing is proportional to a non-decreasing function of the frequency of the received audio signal y(t). The smoothing amount may be directly proportional the frequency of the received audio signal y(t). This scheme reduces artefacts resulting from rapidly fluctuating high-frequency suppression gains which in turn are caused by rapidly changing high-frequency signal components. This scheme also ensures that minimum smoothing is applied for lower frequencies where the powers involved in the echo computation gains are varying less rapidly, thereby achieving the highest possible echo suppressor transparency.

There are various ways of implementing the scheme described above.

In an initial first time period the echo suppression module 310 divides the received audio signal y(t) into a plurality of frequency sub-bands within a frequency range and determines a first set of echo suppression gains G(t,f) to be applied to the respective frequency sub-bands. In a second later time period, the echo suppression module 310 divides the received audio signal y(t) into the plurality of frequency sub-bands within the frequency range and determines a second set of echo suppression gains G(t,f) to be applied to the respective frequency sub-bands.

For each frequency sub-band the echo suppression module 310 determines whether to apply the respective second echo suppression gain, or, use the gain smoothing module 312 to determine a smoothed echo suppression gain equivalent to the respective first echo suppression gain (applied to the respective frequency sub-band of the received audio signal y(t) in the first time period) with an additional amount of gain, in dependence on a comparison of the magnitude of the respective first echo suppression gain with the magnitude of the respective second echo suppression gain.

It will be appreciated that for each frequency sub-band, the respective second echo suppression gain may be higher than, equal to, or less than the respective first echo suppression gain.

When the respective second echo suppression gain is less than or equal to the respective first echo suppression gain the gain smoothing module 312 does not apply smoothing and the echo suppression module 310 applies the respective second echo suppression gain to the received audio signal y(t) in the respective frequency sub-band in the second later time period.

When the respective second echo suppression gain is higher than the respective first echo suppression gain the echo suppression module 310 does not apply the respective second echo suppression gain to the received audio signal y(t) in the respective frequency sub-band. Instead, the gain smoothing module 312 determines a smoothed echo suppression gain equivalent to the respective first echo suppression gain with an additional amount of gain to the respective frequency sub-band in the second later time period wherein the amount of smoothing (and thus the amount of additional gain) is determined in dependence on the frequency sub-band in the second later time period.

That is, in step S418, the echo suppression module 310 applies echo suppression to the received audio signal y(t) using echo suppression gains. That is, the echo suppression module 310 multiplies the received audio signal y(t) in a frequency sub-band by some number between one (i.e. no suppression) and zero (i.e. complete suppression). The echo suppression gains may be one or more echo suppression gains determined in step S414 or one or more smoothed echo suppression gains determined by the gain smoothing module 312 in step S416, in dependence on whether temporal smoothing is required.

The process then continues for later time periods, wherein the echo suppression module 310 divides the received audio signal y(t) into the plurality of frequency sub-bands within the frequency range and determines a set of echo suppression gains G(t,f) to be applied to the respective frequency sub-bands, and compares the magnitudes of the echo suppression gains in the respective frequency sub-bands to those determined for the immediately earlier time period. When the respective later echo suppression gain is higher than the respective earlier echo suppression gain, the gain smoothing module 312 determines a smoothed echo suppression gain equivalent to the respective earlier echo suppression gain with an additional amount of gain to the respective frequency sub-band in the later time period wherein the amount of smoothing (and thus the amount of additional gain) is determined in dependence on the frequency of the frequency sub-band in the second later time period. Otherwise, the gain smoothing module 312 does not apply smoothing and the echo suppression module 310 applies the respective later echo suppression gain to the received audio signal y(t) in the respective frequency sub-band in the later time period.

In one implementation, an increase in smoothing applied in producing a smoothed echo suppression gain is implemented in a linear manner wherein the amount of smoothing increases linearly with increases in frequency band. For simplicity purposes, consider a frequency range $f_{range}$ which is divided into three frequency bands $f_{low}$, $f_{mid}$, and $f_{high}$ where $f_{low} < f_{mid} < f_{high}$. If the later echo suppression gains determined by the echo suppression module 310 for each of $f_{low}$, $f_{mid}$, and $f_{high}$ in a later time period are all higher than the earlier echo suppression gains determined by the echo suppression module 310 for each of $f_{low}$, $f_{mid}$, and $f_{high}$ in an earlier time period then the gain smoothing module 312 determines a smoothed echo suppression gain at each of these frequencies. That is, a smoothed echo suppression gain equivalent to the respective earlier echo suppression gain with an additional amount of gain is applied to the respective frequency sub-band in the later time period by the echo suppressor 310 wherein the amount of smoothing (and thus the amount of additional gain) is determined in dependence on the frequency sub-band.

That is, an amount of smoothing gain $G_1$ is subtracted from the determined echo suppression gain for the lowest frequency band $f_{low}$ to produce a smoothed echo suppression gain, an amount of smoothing gain $G_2$ is subtracted from the determined echo suppression gain for the middle frequency band $f_{mid\text{-}linear}$ to produce a smoothed echo suppression gain, and an amount of smoothing gain $G_3$ is subtracted from the determined echo suppression gain for the highest frequency band $f_{high}$ to produce a smoothed echo suppression gain, whereby $G_3 > G_2 > G_1$ and there are linear increments in the amount of smoothing gain between $G_1$, $G_2$ and $G_3$. For example in the later time period, in the lowest frequency band $f_{low}$ the gain smoothing module 312 may determine, and the echo suppressor 310 may apply, an echo suppression gain equivalent to the respective earlier echo suppression gain (applied in $f_{low}$ in the earlier time period) with an additional amount of gain of +4 dB; in the middle frequency band $f_{mid}$ the gain smoothing module 312 may determine, and the echo suppressor 310 may apply, an echo suppression gain equivalent to the respective earlier echo suppression gain (applied in $f_{mid}$ in the earlier time period) with an additional amount of gain of +2 dB; and in the highest frequency band $f_{high}$ the gain smoothing module 312 may determine, and the echo suppressor 310 may apply, an echo suppression gain equivalent to the respective earlier echo suppression gain (applied in $f_{high}$ in the earlier time period) with an additional amount of gain of +1 dB.

That is, the less smoothing that is applied, the more a respective earlier echo suppression gain is allowed to increase towards a respective later determined echo suppression gain, and the more smoothing that is applied, the less a respective earlier echo suppression gain is allowed to increase towards a respective later determined echo suppression gain.

It will be appreciated that these additional amounts of gain are merely used as examples to illustrate the concept and are not limiting in any way.

In another implementation, the increase in smoothing applied in producing a smoothed echo suppression gain is implemented in an exponential manner wherein the amount of smoothing increases exponentially with increases in frequency band.

That is, an amount of smoothing gain $G_1$ is subtracted from the determined echo suppression gain for the lowest frequency band $f_{low}$ to produce a smoothed echo suppression gain, an amount of smoothing gain $G_2$ is subtracted from the determined echo suppression gain for the middle frequency band $f_{mid\text{-}exp}$ to produce a smoothed echo suppression gain, and an amount of smoothing gain $G_3$ is subtracted from the echo suppression gain for the highest frequency band $f_{high}$ to produce a smoothed echo suppression gain, whereby $G_3 > G_2 > G_1$ and there are exponential increments in the amount of smoothing gain between $G_1$, $G_2$ and $G_3$.

For example in the later time period, in the lowest frequency band $f_{low}$ the gain smoothing module 312 may determine and the echo suppressor 310 may apply an echo suppression gain equivalent to the respective earlier echo suppression gain (applied in $f_{low}$ in the earlier time period) with an additional amount of gain of +9 dB, in the middle frequency band $f_{mid}$ the gain smoothing module 312 may determine and the echo suppressor 310 may apply an echo suppression gain equivalent to the respective earlier echo suppression gain (applied in $f_{mid}$ in the earlier time period) with an additional amount of gain of +4 dB, and in the highest frequency band $f_{high}$ the gain smoothing module 312 may determine and the echo suppressor 310 may apply an echo suppression gain equivalent to the respective earlier echo suppression gain (applied in $f_{high}$ in the earlier time period) with an additional amount of gain of +1 dB. It will be appreciated that these additional amounts of gain are merely used as examples to illustrate the concept and are not limiting in any way.

Regardless of the implementation used, the additional amount of smoothing applied in producing a smoothed echo suppression gain is varied according to the frequency in the sense that the amount of smoothing increases with increasing frequency. This results in that the allowed gain increases per sample, decreases with increasing frequency.

Whilst the effects of the smoothing applied in the above implementations have been described above with reference to the effect on the amount of additional gain (measured in dB) that is added to an earlier echo suppression gain to produce a smoothed echo suppression gain. Some embodiments may apply smoothing in a way that cannot be expressed in terms of an amount of smoothing (measured in dB) that is applied to an earlier echo suppression gain to produce a smoothed echo suppression gain.

For example, a smoothed echo suppression gain G may be determined according to the following equations:

$$G(t,f\_\text{low}) = X_{smooth\text{-}low} * G(t-1, f\_\text{low}) + [(1 - X_{smooth\text{-}low}) * G\_\text{prel}(t, f\_\text{low})]$$

$$G(t,f\_\text{high}) = X_{smooth\text{-}high} * G(t-1, f\_\text{high}) + [(1 - X_{smooth\text{-}high}) * G\_\text{prel}(t, f\_\text{high})]$$

where G_prel is a preliminary echo suppression gain which is used to form the smoothed echo suppression gain G, $X_{smooth\text{-}low}$ is a smoothing constant for lower frequencies, and $X_{smooth\text{-}high}$ is a smoothing constant for higher frequencies. According to these equations, the amount of smoothing increases for higher frequencies since the smoothing constant ($X_{smooth}$) increases for higher frequencies (for example the smoothing constant may be 0.9 for lower frequencies and 0.99 for higher frequencies). In this example it is not possible to express the amount of smoothing in dB since it is controlled by a smoothing factor.

Each of the above implementations may be used in a scheme to move to a target gain value by way of a linear or exponential transition over a plurality of time periods.

That is, if an echo suppression gain determined by the echo suppression module 310 for a particular frequency band is higher than the echo suppression gain used in an immediately earlier time period for that particular frequency band over a plurality of time periods, then the gain smoothing module 312 determines, and the echo suppressor 310 applies, a smoothed echo suppression gain at each of these time periods for the particular frequency band, wherein the gain values of the smoothed echo suppression gains increase linearly over the plurality of time periods.

Similarly, if an echo suppression gain determined by the echo suppression module 310 for a particular frequency band is higher than the echo suppression gain used in an immediately earlier time period for that particular frequency band over a plurality of time periods, then the gain smoothing module 312 determines, and the echo suppressor 310 applies, a smoothed echo suppression gain at each of these time periods for the particular frequency band, wherein the gain values of the smoothed echo suppression gains increase exponentially over the plurality of time periods.

The inventor has identified that the amount of variations in the echo suppressing gains typically increases with frequency. This is caused by the fact that the signal powers of the echo and microphone signals are changing much more rapidly at high frequencies. To reduce the unwanted artefacts caused by these rapidly changing high frequency echo suppression gains an increased smoothing of the high-frequency echo suppression gains is implemented in accordance with embodiments described herein. Since the variations in the signal powers decrease for decreasing frequencies, the necessary amount of smoothing needed to ensure that pleasantly sounding echo suppressing gains also decreases for decreasing frequencies.

The inventor has further identified that typically the error in the power estimates of the echo increases for higher frequencies and therefore the increased amount of smoothing (at the higher frequencies) reduces the artefacts caused by this.

The time periods referred to above may correspond to frames of the received audio signal y(t), however this is merely an example, and the time periods may correspond to a longer or shorter length of time than a time period in which a frame of the received audio signal y(t) is received.

Whilst embodiments have been described above with reference to the echo suppression module 310 processing the received audio signal y(t) by dividing it into three frequency sub-bands within a frequency range for simplicity, this is merely an example and the echo suppression module 310 may handle the received audio signal y(t) by dividing into N frequency sub-bands within a frequency range where N is an integer value greater than or equal to two.

For simplicity, embodiments have been described above with reference to a scenario in which for each time period, each of the determined echo suppression gains is higher than each of the echo suppression gains that was applied in an earlier time period. It will be appreciated in other scenarios, for a particular time period, in respect of some of the N frequency sub-bands the determined echo suppression gain may not be higher than the echo suppression gain applied in that frequency sub-band in the earlier time period. The principles of the embodiments described above still apply to these other scenarios. That is, for the frequency sub-bands of the N frequency sub-bands in which the determined echo suppression gain is higher than the echo suppression gain applied in that frequency sub band in the earlier time period, then the additional amount of smoothing gain applied in these frequency bands does not decrease when the frequency of the received audio signal y(t) in these frequency bands increases.

Whilst implementations are described above with reference to applying an increase in smoothing in producing a smoothed echo suppression gain in a linear or exponential manner, it will be appreciated that these are merely examples and other implementations may be used. Regardless of the particular implementation, when smoothing of the echo suppression gains is required the amount of the temporal smoothing of the gains in the echo suppression module is adjusted in such a way that the amount of smoothing is varied according to a non-decreasing function of the frequency of the received audio signal y(t). That is, the amount of smoothing increases with increasing frequency of the received audio signal y(t).

The echo suppression module 310 outputs the received signal, with the echo having been suppressed, for further processing at the user device 104. For example, the signal output from the echo suppression module 310 may be processed by the client 206 (e.g. encoded and packetized) and then transmitted over the network 106 to the user device 110 in a call between the users 102 and 108. Additionally or alternatively, the signal output from the echo suppression module 310 may be used for other purposes by the user device 104, e.g. the signal may be stored in the memory 214 or used as an input to an application which is executing at the user device 104.

In the embodiments described above, the echo suppression is implemented in a VoIP system (e.g. the received audio signal may include speech of the user 102 for transmission to the user device 110 during a call between the users 102 and 108 over the communication system 100). However, the echo suppression methods described herein can be applied in any suitable system in which echo suppression is to be applied.

In the embodiments described above, and shown in the Figures, echo cancellation (or "echo subtraction") is not applied to the received audio signal y(t). That is, there is no echo cancellation module in the user device 104 and the echo suppression is applied to the received audio signal y(t) without a prior step of applying echo cancellation to the received audio signal y(t).

However, in other embodiments, echo cancellation may be applied, by an echo cancellation module, to the received audio signal y(t). In particular, the echo suppression applied by the echo suppression module 310 may be applied downstream of (i.e. after) the echo cancellation in the processing of the received audio signal y(t). The echo cancellation module would subtract an estimate of the echo signal from the received audio signal, but due to inaccuracies in the estimate of the echo signal, a residual echo would most-likely remain in the received audio signal. It is the residual echo that would then be suppressed by the echo suppression module 310. This echo suppression could be applied in the same way as described herein in the embodiments in which no echo cancellation is applied. If echo subtraction is used, the effect of it can be taken into account in the echo suppression.

The methods described herein may be implemented by executing a computer program product (e.g. the client 206) at the user device 104. That is, a computer program product may be configured to suppress echo in the received audio signal y(t), wherein the computer program product is embodied on a computer-readable storage medium (e.g. stored in the memory 214) and configured so as when executed on the CPU 202 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 and referred to in the text above may or may not be implemented as separate modules or steps. For example, the echo suppression module 310 may perform the function of the power estimating module 306 and the power determination module 308. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of suppressing echo, the method comprising:
outputting an audio signal;
receiving an audio signal, wherein the received audio signal includes echo resulting from said outputted audio signal;
modelling an echo path of the echo in the received audio signal using an adaptive model based on the outputted audio signal and the received audio signal to determine an adaptive model estimate of the echo in the received audio signal;
using the adaptive model estimate to determine an estimate of the echo power of the echo in the received audio signal;
determining the power of the received audio signal;
using the estimate of the echo power and the determined power of the received audio signal to determine echo suppression gains; and
applying temporal smoothing to one or more of the determined echo suppression gains and using the one or more smoothed echo suppression gains to apply echo suppression to the received audio signal, thereby suppressing the echo in the received audio signal, wherein the amount of smoothing applied to the one or more echo suppression gains is varied according to a non-decreasing function of the frequency of the received audio signal.

2. The method of claim 1, wherein the amount of smoothing applied to the one or more echo suppression gains is varied such that the amount of smoothing is proportional to the non-decreasing function of the frequency of the received audio signal.

3. The method of claim 1, the method further comprising:
determining echo suppression gains used to apply echo suppression in a first time period for a plurality of frequencies in a frequency range;
in a second later time period, determining echo suppression gains for the plurality of frequencies in the frequency range;
comparing the echo suppression gains used in the first time period and the echo suppression gains determined for the second later time period for said plurality of frequencies; and
in the second later time period, applying temporal smoothing to one or more of the determined echo suppression gains determined in the second later time period based on said comparison.

4. The method of claim 3, wherein the method comprises applying the temporal smoothing at one or more frequency at which the echo suppression gain determined in the second later time period exceeds the echo suppression gain used in the first time period at said one or more frequency.

5. The method of claim 3, wherein if the echo suppression gain determined in the second later time period at one or more frequency is less than or equal to the echo suppression gain determined in the first time period at said one or more frequency, the method comprising using the echo suppression gain determined in the second later time period at said one or more frequency to apply echo suppression to the received audio signal.

6. The method of claim 4, wherein an amount of smoothing applied to the one or more echo suppression gain determined in the second later time period increases with increasing frequency.

7. The method of claim 6, wherein:
an amount of smoothing applied to the one or more echo suppression gain determined in the second later time period increases linearly with increasing frequency; or
an amount of smoothing applied to the one or more echo suppression gain determined in the second later time period increases exponentially with increasing frequency.

8. The method of claim 1, wherein if an echo suppression gain determined in a later time period exceeds the echo suppression gain used to apply echo suppression in an earlier time period at one or more frequencies, at each of a plurality of time periods, the smoothed echo suppression gains used to apply echo suppression to the received audio signal increase over the plurality of time periods.

9. The method of any claim 8, wherein:
the smoothed echo suppression gains used to apply echo suppression to the received audio signal increase linearly over the plurality of time periods; or
the smoothed echo suppression gains used to apply echo suppression to the received audio signal increase exponentially over the plurality of time periods.

10. The method of claim 1, wherein said echo suppression is applied to the received audio signal without a prior step of applying echo cancellation to the received audio signal.

11. The method of claim 1, further comprising applying echo cancellation to the received audio signal, wherein said echo suppression is applied downstream of the echo cancellation in the processing of the received audio signal.

12. The method of claim 1, wherein the method is performed at a user device for use in a communication event, and wherein the received audio signal comprises speech of a user for transmission from the user device in the communication event.

13. The method of claim 12, wherein the communication event is a voice-over-internet-protocol (VoIP) call, wherein the outputted audio signal comprises far-end speech signals of the VoIP call which are included in the echo in the received audio signal.

14. A device configured to implement echo suppression, the device comprising:
   audio output apparatus configured to output an audio signal;
   audio input apparatus configured to receive an audio signal, wherein the received audio signal includes an echo resulting from said outputted audio signal;
   a modelling module configured to model an echo path of the echo in the received audio signal using an adaptive model based on the outputted audio signal and the received audio signal to determine an adaptive model estimate of the echo in the received audio signal;
   a power estimating module configured to use the adaptive model estimate to determine an estimate of the echo power of the echo in the received audio signal;
   a power determining module configured to determine the power of the received audio signal; and
   an echo suppression module configured to use the estimate of the echo power and the determined power of the received audio signal to determine echo suppression gains, and apply temporal smoothing to one or more of the determined echo suppression gains and use the one or more smoothed echo suppression gains to apply echo suppression to the received audio signal, thereby suppressing the echo in the received audio signal, wherein the amount of smoothing applied to the one or more echo suppression gains is varied according to a non-decreasing function of the frequency of the received audio signal.

15. The device of claim 14, wherein the audio output apparatus comprises a speaker configured to output the outputted audio signal, and wherein the audio input apparatus comprises a microphone configured to receive the received audio signal.

16. The device of claim 14, wherein the device does not comprise an echo cancellation module configured to apply echo cancellation to the received audio signal.

17. The device of claim 14, further comprising an echo cancellation module configured to apply echo cancellation to the received audio signal, wherein said echo suppression module is arranged to be applied after the echo cancellation module in the processing of the received audio signal.

18. The device of claim 14, wherein the device is a user device useable by a user and wherein the device is configured for use in a communication event, said user device further comprising a transmission module configured to transmit received audio signals from the user device in the communication event.

19. The device of claim 18, wherein the communication event is a voice-over-internet-protocol (VoIP) call.

20. A device configured to suppress echo in a received audio signal, said echo resulting from an outputted audio signal, the device comprising:
   a modelling module configured to model an echo path of the echo in the received audio signal using an adaptive model based on the outputted audio signal and the received audio signal to determine an adaptive model estimate of the echo in the received audio signal;
   a power estimating module configured to use the adaptive model estimate to determine an estimate of the echo power of the echo in the received audio signal;
   a power determining module configured to determine the power of the received audio signal;
   an echo suppression module configured to:
      determine echo suppression gains used to apply echo suppression in a first time period for a plurality of frequencies in a frequency range;
      in a second later time period, use the estimate of the echo power and the determined power of the received audio signal to determine echo suppression gains for the plurality of frequencies in the frequency range;
      compare the echo suppression gains used in the first time period and the echo suppression gains determined for the second later time period for said plurality of frequencies; and
      in the second later time period, applying temporal smoothing to one or more of the determined echo suppression gains determined in the second later time period based on said comparison, and use the one or more smoothed echo suppression gains to apply echo suppression to the received audio signal, thereby suppressing the echo in the received audio signal, wherein the amount of smoothing applied to the one or more echo suppression gains is varied according to a non-decreasing function of the frequency of the received audio signal.

* * * * *